(12) United States Patent
Shin

(10) Patent No.: US 6,975,724 B2
(45) Date of Patent: Dec. 13, 2005

(54) FOLDER TYPE MOBILE COMMUNICATION TERMINAL

(75) Inventor: Hyun Ki Shin, Seoul (KR)

(73) Assignee: SK Teletech Co., Ltd., Seoul (KR)

( * ) Notice: Subject to any disclaimer, the term of this patent is extended or adjusted under 35 U.S.C. 154(b) by 737 days.

(21) Appl. No.: 09/927,945

(22) Filed: Aug. 10, 2001

(65) Prior Publication Data

US 2002/0142736 A1 Oct. 3, 2002

(30) Foreign Application Priority Data

Feb. 7, 2001 (KR) .......................................... 2001-5865

(51) Int. Cl.[7] .............................................. H04M 1/00
(52) U.S. Cl. ............................. 379/433.13; 455/90.3; 455/575.3; 16/303; 361/814
(58) Field of Search ...................... 455/550.1, 575.1, 455/90.3, 575.3; 379/433.13; 16/303; 361/814; 710/62

(56) References Cited

U.S. PATENT DOCUMENTS

| 5,363,089 A | | 11/1994 | Goldenberg |
| 5,628,089 A | * | 5/1997 | Wilcox et al. ................. 16/303 |
| 5,629,979 A | | 5/1997 | Domoleczny |
| 5,651,063 A | | 7/1997 | Ji et al. |
| 5,658,157 A | | 8/1997 | Koiwa et al. |
| 5,661,797 A | | 8/1997 | Leman et al. |
| 5,996,178 A | * | 12/1999 | Murray ......................... 16/303 |
| 6,011,699 A | * | 1/2000 | Murray et al. .............. 361/814 |
| 6,104,916 A | * | 8/2000 | Steinhoff et al. ......... 455/575.3 |
| 6,189,056 B1 | * | 2/2001 | Ogura et al. ................... 710/62 |

* cited by examiner

*Primary Examiner*—Fan Tsang
*Assistant Examiner*—Md Shafiul Alam Elahee
(74) *Attorney, Agent, or Firm*—Morgan, Finnegan, L.L.P.

(57) ABSTRACT

A folder type mobile communication terminal includes a first housing and a second housing hingedly connected to the first housing. The second housing includes a second knuckle on the rotation axis where the second knuckle defines an opening hole inside thereof for insertion of a connection cable, a second hinge aperture formed in the axial direction of the rotation axis to allow the connection cable to insert therethrough, a projecting part at one end, and a structure at the opposite end which allows installation of a hinge spring assembly. The first housing includes first knuckles formed at both ends, where the first knuckles define a first hinge aperture that is directed to the direction of the second hinge aperture, and a first slot formed in the bottom of one of the first knuckles to enable the connection cable to insert therethrough.

2 Claims, 7 Drawing Sheets

FOLDER TYPE MOBILE COMMUNICATION TERMINAL

BACKGROUND OF THE INVENTION

1. Field of the Invention

The present invention relates to a folder type mobile communication terminal which is characterized in that a projecting part of the second housing including a slot for insertion of a connection cable such as FPC (Flexible Printed Circuitry) or FFC(Flat Flexible Cable) inserts into a hinge aperture in a knuckle of the first housing to form a rotation axis.

2. Description of the Prior Art

The mobile communication terminals tend to be reduced in size and weight for better portability. Manufacturers of mobile communication terminals provide a variety of mobile communication terminals to this end, of which the most typical one is folder type mobile communication terminal.

A folder type mobile communication terminal generally comprises a first housing and a second housing, wherein the first housing includes a microphone, main PCB, and a keypad, while the second housing includes a speaker and a liquid crystal display for display of various information.

The first and the second housings should be coupled to each other by a connection cable such as FPC or FFC in order to allow data transmission between the first and the second housings. However, if the connection cable remains exposed outside of the housings, not only is the outlook of the mobile terminal unfavourable, but also it becomes vulnerable for damages. Therefore, a connection path for the connection cable should be provided inside of the mobile communication terminal, which is capable of protecting the connection cable from damages by repeated folding and unfolding of the mobile communication terminal.

Figure 1:
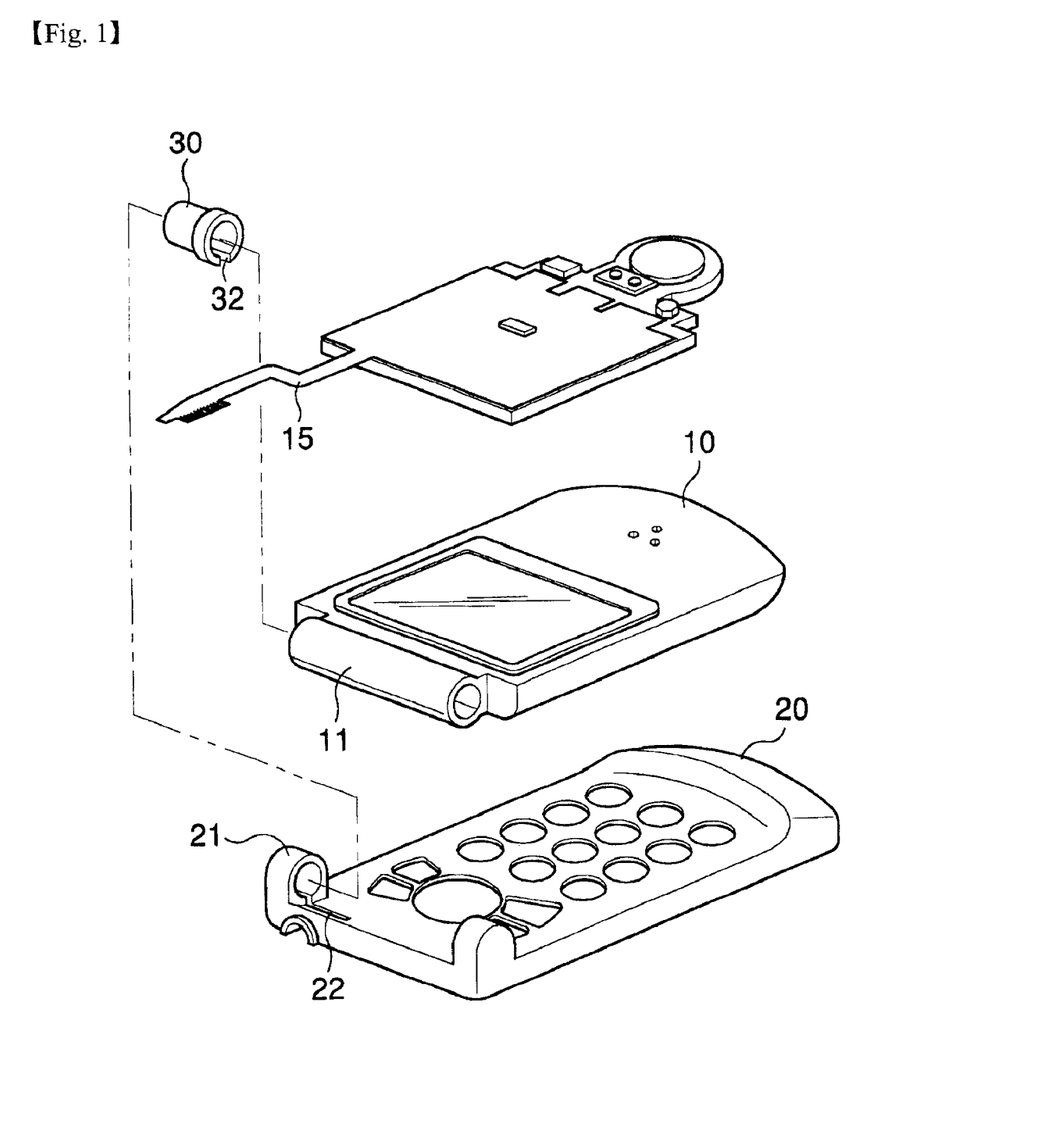
FIG. 1 is an exploded view of a conventional folder type mobile communication terminal.

A technique aiming to solve the above problem is disclosed in U.S. Pat. No. 6,011,699. FIG. 1 is a perspective exploded view illustrating the structure of FPC coupling of the folder type mobile communication terminal as disclosed in U.S. Pat. No. 6,011,699.

FIG. 1 illustrates a folder type mobile communication terminal comprising a first housing 20 having a first knuckle 21 that defines a first hinge aperture communicating with a second hinge aperture and a slot 22 allowing a FPC 15 to insert through it for connection to the main PCB; and a second housing 10 having a second knuckle 11 that defines a slot at the inner side and a second hinge aperture formed along the hinge axis, wherein the first and the second housings are coupled to each other by shaft 30.

One end of shaft 30 is inserted and fixed into the second knuckle 11 of the second housing 10. The other end of shaft 30 inserts into and interfaces with the inside of the first knuckle 21 of the first housing 20, and has a slot 32 which physically coincides with slot 22 formed in the first knuckle 21.

Accordingly, FPC 15 which is mounted in the second housing 10 and used for data transmission from different wiring devices connected to a speaker and a liquid crystal display inserts through the slot of the second knuckle 11 and is wound by 540° in the second hinge aperture and then passes through slots 32, 22 by way of shaft 30 so as to connect with the main PCB of the first housing 20. In such a way, FPC 15 is saved from external exposure and thus protected better from possible damages, in addition to more elegant outlook, while at the same time allowing easy opening and closing of the first and the second housings.

However, the folder type mobile communication terminal pursuant to U.S. Pat. No. 6,011,699 is disadvantageous in that many components are required for connecting the FPC 15 mounted in the second housing 10 to the main PCB of the first housing 20, and that the components are complex in shapes, thus leads their manufacture costs to increase.

Moreover, the assembling procedure is complicated and takes much time because the FPC 15 should be wound in the hinge aperture and in the shaft by over 360° in order to prevent damage of FPC 15 that might be caused by repeated folding and unfolding of the folder.

SUMMARY OF THE INVENTION

It is an objective of the present invention to provide a folder type mobile communication terminal comprising a first housing and a second housing connected to the first housing by hinge(s), wherein the second housing (upper folder) includes a second knuckle defining a second hinge aperture serving as a rotation axis and an opening hole leading into the second hinge aperture and formed in the middle of the inner sidewall of the second knuckle; and the first housing (lower folder) includes first knuckles at both ends defining first hinge apertures directed to the direction of the second hinge aperture for connection to the second knuckle, and a first slot extending from the bottom of one of the first knuckles toward the front surface of the first housing, a projecting part formed at one end of the second knuckle so as to insert rotatably into the inner periphery of the first hinge aperture, a structure formed at the other end, which allows installation of a hinge spring assembly used for opening and closing of the folder type mobile communication terminal.

BRIEF DESCRIPTION OF THE DRAWINGS

FIG. 2b is a side cross-sectional view of the second knuckle taken along the line B–B', i.e. the hinge axis of the second housing of the folder type mobile communication terminal as shown in FIG. 2a.

FIG. 2c is a detailed view of the second hinge aperture as shown in FIG. 2a.

EXPLANATION OF THE MAIN PARTS OF THE DRAWINGS

| | |
|---|---|
| 10, 100: the second housing | 20, 200: the first housing |
| 11, 110: the second knuckle | 15, 150: FPC |
| 21, 210: the first knuckle | 22, 32: slot |
| 30: shaft | 111: the second hinge aperture |
| 112: isolation plate | 113: opening hole |
| 114: the second slot | 115: hinge spring assembly |
| 116: subsidiary guide slot | 120: projecting part |
| 151: FPC'connection part | 155: liquid crystal display |
| 211: the first hinge aperture | 212: the first slot |
| 220: keypad | 230: main PCB |

DETAILED DESCRIPTION OF THE INVENTION

Below, a detailed description of the preferred embodiments of the present invention is given making reference to the accompanying drawings.

Figure 2A:
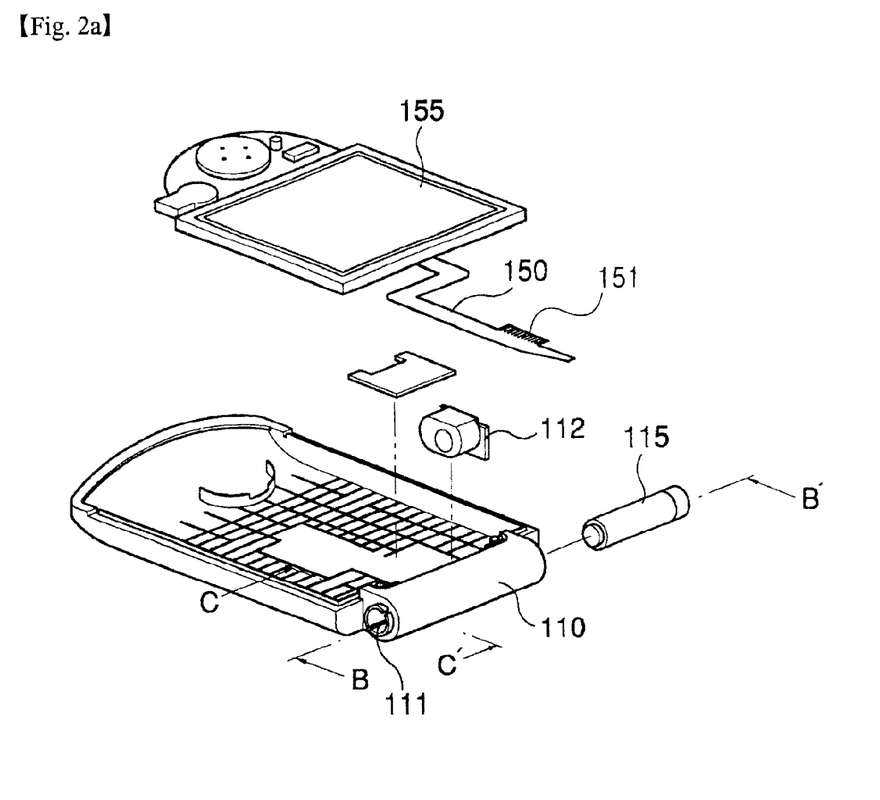
FIG. 2a is an outlined perspective exploded view illustrating the structure of the second housing of the folder type mobile communication terminal according to the present invention.
Figure 3A:
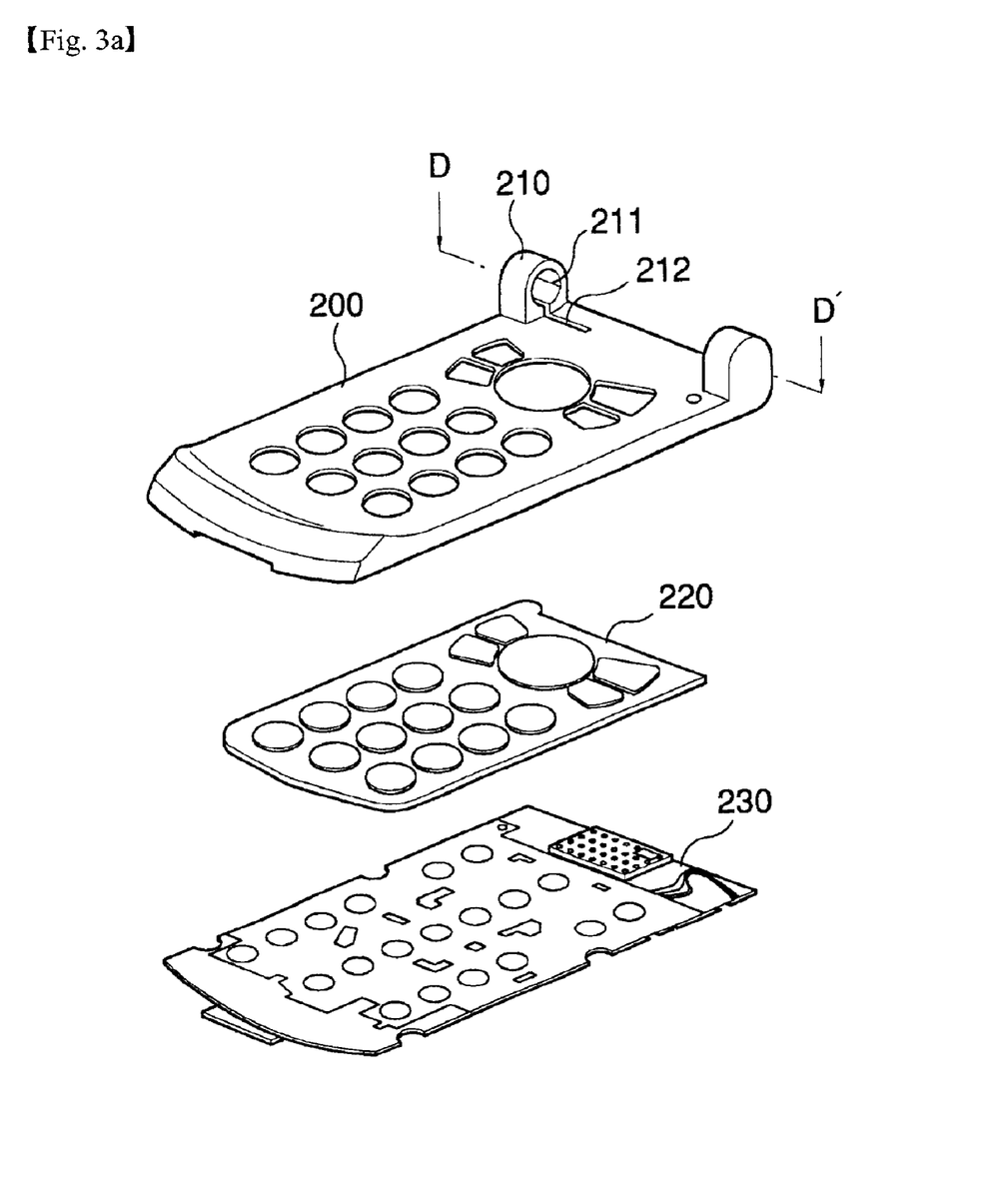
FIG. 3a is an outlined perspective exploded view illustrating the structure of the first housing of the folder type mobile communication terminal according to the present invention.

FIG. 2 is an outlined perspective exploded view of the second housing of the folder type mobile communication terminal according to the present invention and FIG. 3 is an outlined perspective exploded view of the first housing of the folder type mobile communication terminal according to the present invention.

First, the second housing 100 (upper folder) is described making reference to FIG. 2.

Figure 2B:
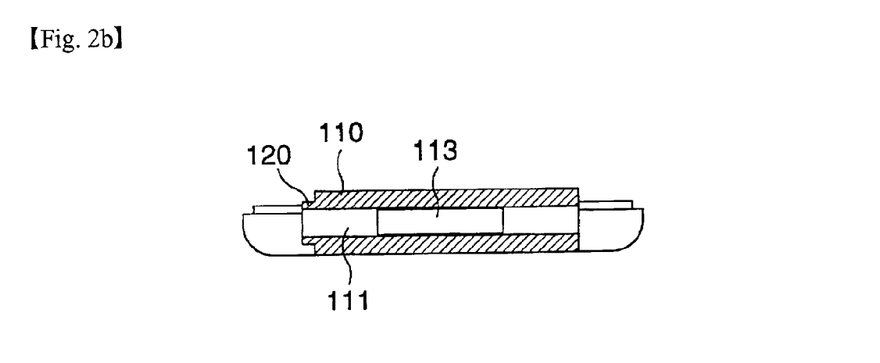
Figure 2C:
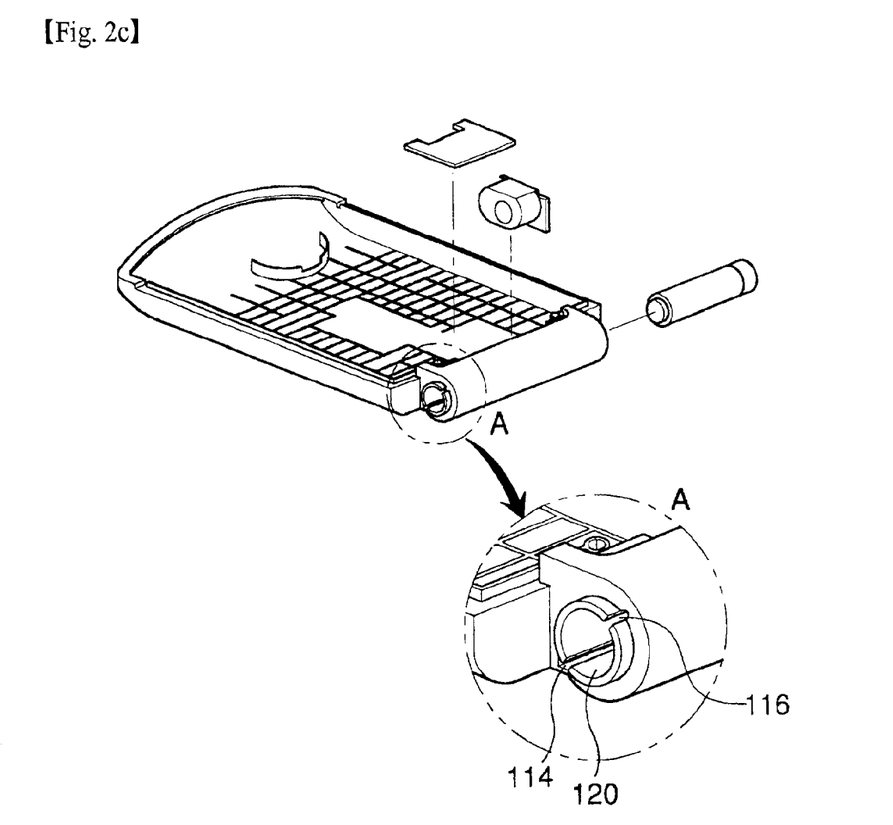
Figure 2D:
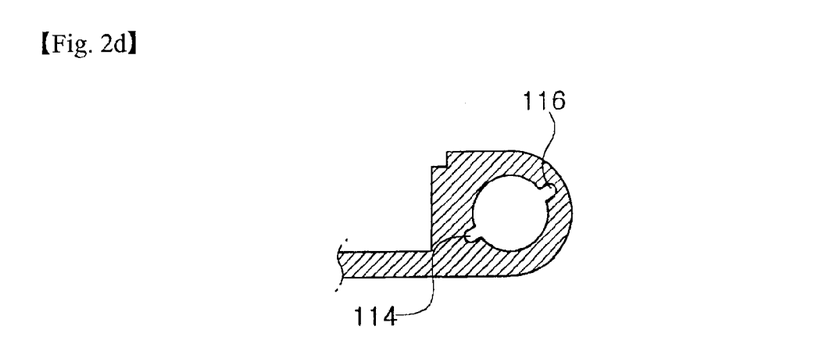
FIG. 2d is a cross-sectional view of the second hinge aperture of the second housing of the folder type mobile communication terminal as shown in FIG. 2a, taken along the line C–C', i.e. a line perpendicular to the hinge axis.

FIG. 2a is an exploded perspective view of the second housing 100 showing a speaker/LCD (Liquid Crystal Display) and a hinge spring assembly in separation shown, FIG. 2b is a cross-sectional view of the second housing 100 taken along the line B–B' of the hinge axis in FIG. 2a, and FIG. 2d is a cross-sectional view of the second hinge aperture 111 taken along the line C–C', perpendicular to the hinge axis in FIG. 2a.

As shown in FIG. 2a, the second housing 100 comprises a speaker with LCD 155 and a wiring device with a connection cable for data transmission coupled to the speaker with LCD 155. The connection cable may be FPC, FFC, or others. In the present invention, FPC 150 is taken as an example for the purpose of description.

In the middle of one end of the second housing is positioned the second knuckle 110 which comprises an opening hole 113 that is formed internally for insertion of FPC 150 (to be explained in detail below in relation to FIG. 2b) and the second hinge aperture 111 that is longitudinally formed along the axial direction of the hinge axis allowing FPC 150 to pass through it along the hinge axis.

One end of the second hinge aperture 111 is used as a connection path for FPC 150. At one end of the second knuckle 110 is formed a projecting part 120 which will rotatably insert into the inner periphery of the first aperture 211 of the first knuckle 210 of the first housing 200, which is explained below (see FIG. 2c). In other words, the projecting part 120 formed at one end of the second knuckle 110 inserts into the first hinge aperture 211 of the first knuckle 210 so as for the outer periphery of the projecting part 120 interfaces with the inner periphery of the first hinge aperture 211, thereby serving as a hinge during opening and closing of housings 100, 200. The depth of the insertion of the projecting part 120 into the first hinge aperture 211 is preferably sized in a manner that the first and the second housings 200, 100 are easily to be assembled and do not break off when they are folded or unfolded. The FPC used in a folder type mobile communication terminal has connection slots at both ends for connection to the main PCB and LCD, as shown in FIGS. 1 and 2a. Such connection slots generally have a width wider than the remaining part of FPC as well as the diameter of the first and the second hinge apertures. Accordingly, at the extremities of the projecting part 120 and the second hinge aperture 111, a second slot 114 is provided to serve as a passageway that allows FPC's connection part 151 wider than the diameter of the second hinge aperture 111 to pass through it. In addition, at the opposite parts of the projecting part 120 and the FPC passage route of the second hinge aperture 111, a subsidiary guide slot 116 may be additionally provided to serve as a guideway that prevents FPC's connection part 151 from being damaged during passing said second hinge aperture 111.

Into the other end of the second knuckle 110 inserts a hinge spring assembly 115 to enable housings 100, 200 to be easily opened or closed. Further, in the middle of the second knuckle 110, an isolation plate 112 is provided to support the hinge spring assembly 115.

Further, the length of FPC 15 in the axial direction of the hinge axis, in difference from that in the above-described U.S. Patent, is rendered the longest possible as far as FPC 15 does not interfere with the isolation plate 112, so that damage of FPC 15 caused by the torsional stress generated in FPC during opening and closing operations of the first and the second housings, is prevented. A more detailed description of this follows below in relation to FIG. 4a.

As shown in FIG. 2b, an opening hole 113 for insertion of FPC 15 is provided in the middle of an inner sidewall of the second knuckle 110. The opening hole 113 should be sized in a manner that FPC 15 is not damaged during assembling.

As shown in FIG. 2d, the projecting part 120 and the passage route for FPC 15 provided inside of the second hinge aperture 111 comprise the second slot 114 that allows FPC's connection part 151 wider than the diameter of the second hinge aperture 111 to pass through it. In the present embodiment, the second slot 114 is positioned at an angle of 45 degrees with the horizon of the second housing but the location is not restricted to such a position.

Next, the first housing 200 according to the present invention is described, in reference to FIG. 3.

Figure 3B:
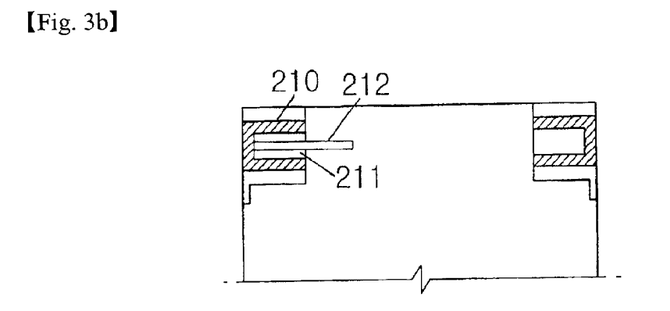
FIG. 3b is a planer cross-sectional view of the first knuckle as shown in FIG. 3a taken along the line D–D'.

FIG. 3a shows a perspective exploded view of the first housing 200 with keypad 220 and main PCB 230 as separated. FIG. 3b is a cross-sectional view of the first housing 200 taken along the line D–D' in FIG. 3a.

As shown in FIG. 3a, the first housing 200 (lower folder) has the first knuckles 210 at both ends of the hinge axis, wherein the first knuckle 210 at one end defines the first hinge aperture 211 into which the projecting part 120 projected from one end of the second knuckle 110 inserts, while the first knuckle 210 at the other end defines a hinge spring assembly hole for supporting the hinge spring assembly 115.

As shown in FIG. 3b, the first slot 212 is formed in the bottom face of the first knuckle 210 and part of upper surface of the first housing so as to allow FPC 150 which inserts into the first and the second hinge apertures 112, 111 through the opening hole 113 of the second knuckle 110, to pass out through the first housing 200. After passing out through the first slot 212, FPC 150 connects to main PCB 230 of the first housing 200. The first slot 212 has such a length as to allow easy insertion of FPC 150. Further, the first slot 212 is preferably formed in the bottom face to be downwardly perpendicular to the hinge axis so that it cannot be seen from the outside during opening and closing of the housings 100, 200.

Next, structure of the FPC connection between the first and second housings is described below making reference to FIG. 4.

Figure 4A:
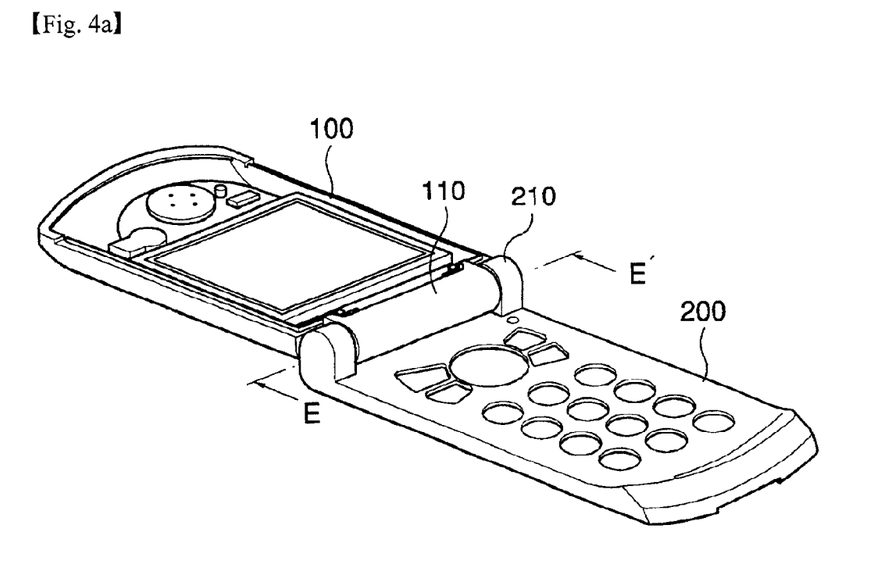
FIG. 4a is a perspective view illustrating the first and the second housings coupled to each other, in an open position.

FIG. 4a is a perspective view illustrating the first and the second housings 200, 100 as coupled to each other, in an open position. FIG. 4b is an opened-up view showing the interior of FIG. 4a. FIG. 4c is a cross-sectional view taken along the line E–E' in FIG. 4a.

As shown in FIG. 4a, the line E–E' stands for the rotation axis of the first and the second housings 200, 100 which are opened and closed by pivoting on this axis.

Figure 4B:
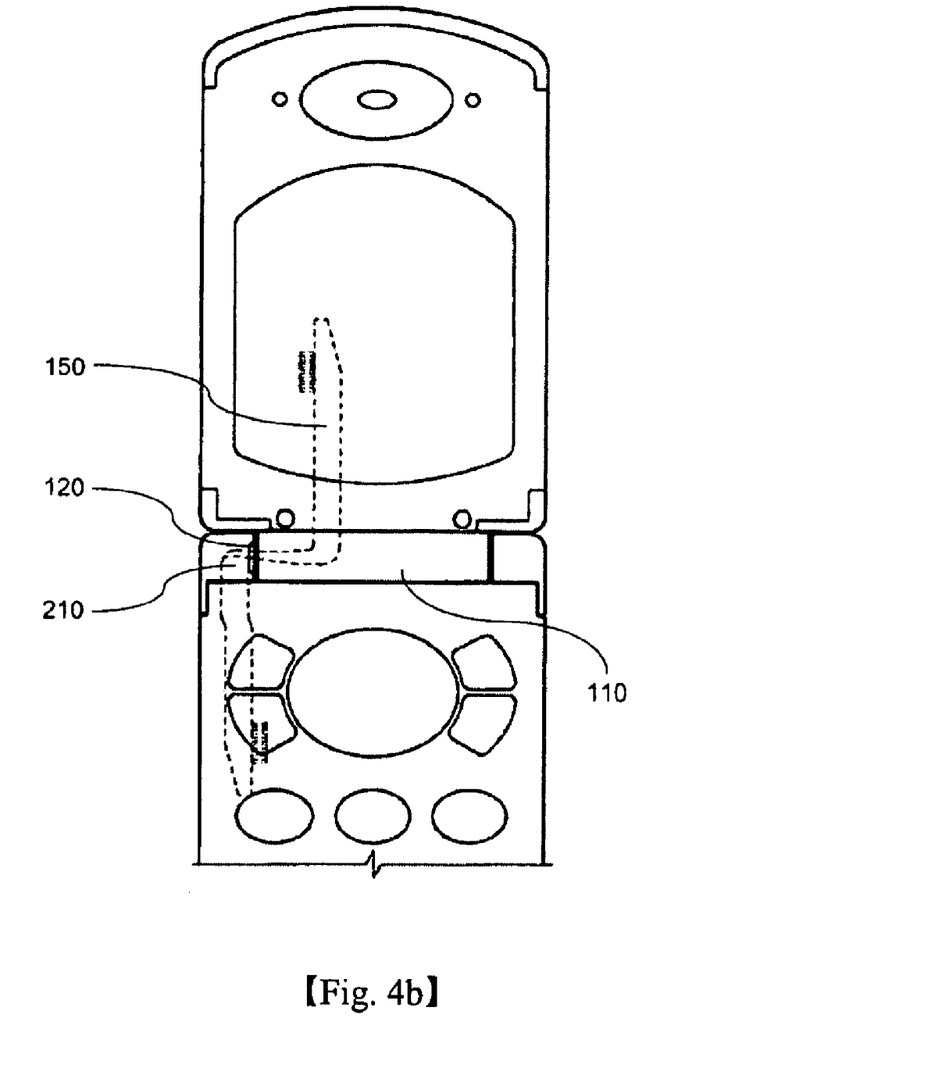
FIG. 4b is an opened-up view showing the interior of the folder of the folder type mobile communication terminal according to the present invention, in an open position.
Figure 4C:
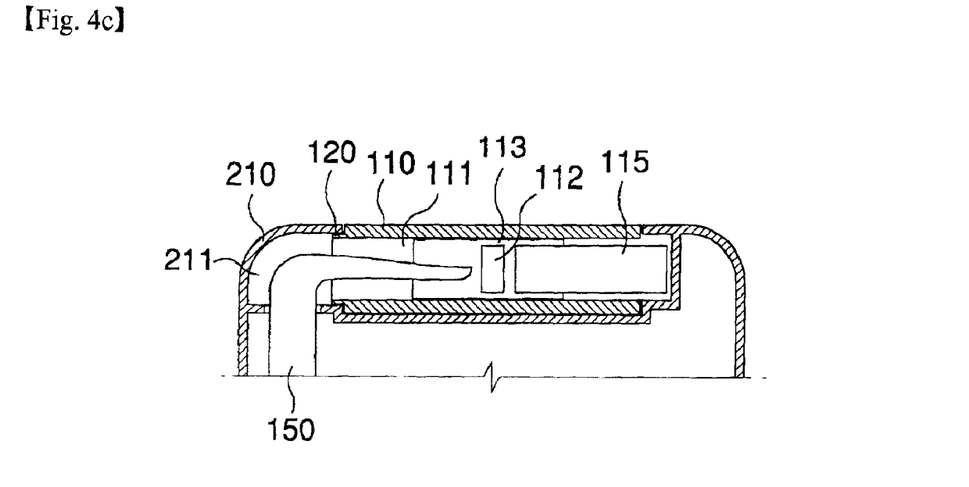
FIG. 4c is a cross-sectional view as shown in FIG. 4a taken along the line E–E'.

As shown in FIGS. 4b and 4c, the length of FPC 15 in the axial direction of the hinge axis is rendered the longest so far as FPC 15 does not interfere with the isolation plate 112. In this way, the damages of FPC 15 that might arise from the torsional stress generated by openings or closings of the first and the second housings 200, 100 can be prevented. In case of the conventional method (U.S. Patent) the length of FPC along the hinge axis is so short that FPC 15 is easily damaged due to the heavy strength applied to the tortured part during openings or closings of the housings.

As shown in FIG. 4c, the projecting part 120 projected from one end of the second knuckle 110 inserts into the first hinge aperture 211 of the first knuckle 210 so as for the outer periphery of the projecting part 120 interfaces with the inner periphery of the first hinge aperture 211, thereby forming a rotation surface for opening and closing of the housings 100, 200 while at the same time preventing the first and the second housings 200, 100 from breaking off during rotation. Here, the depth of the insertion of the outer periphery of the projecting part 120 into the first knuckle 210 should be so sized that not only the first and the second housings 200, 100 can avoid separation in spite of the frequent folding and unfolding, but also they can be easily assembled. Further, the hinge spring assembly 115 is provided to the other end of the second knuckle 110 so that the housings 100, 200 can be easily opened and closed without breaking-off.

As such, housings 100, 200 are connected to each other by using the projecting part 120 formed at one end of the second knuckle 110, and the second hinge aperture 111 can communicate with the first hinge aperture 211. Meanwhile, the FPC 150 inserts into the opening hole 113 provided inside of the second knuckle 110 and passes through the second hinge aperture 111 and the first hinge aperture 211, out of the first slot 212 formed in the bottom face of the first knuckle 210. The FPC 150 passing out through the first knuckle 210 connects to the main PCB 230.

Although the present invention has been described above with reference to the preferred embodiments and accompanying drawings, it should be noted that the scope of the rights of the present invention is not limited thereto, but rather shall be determined by the appended claims, allowing various alterations, modifications and adjustments as those skilled in the art will understand.

The folder type mobile communication terminal according to the present invention includes the first and the second housings, wherein the second housing includes the second knuckle that defines an opening hole inside thereof for insertion of FPC and a projecting part at one end, the first housing includes the first knuckle that is coupled to the projecting part of the second knuckle and defines a slot at the bottom for passage of FPC, whereby the simplified structure of the FPC connection enables easy assembling as well as reduction of the manufacture costs. Further, the extended length of the FPC in the axial direction of the rotation axis, enables the FPC less damaged by the torsional stress generated by openings and closings of the folder type mobile communication terminal.

What is claimed is:

1. A folder type mobile communication terminal comprising:

a first housing; and a second housing hingedly connected to said first housing, wherein said second housing comprises, on a surface facing said first housing, a second knuckle defining a second hinge aperture serving as a rotation axis, and an opening hole in a middle of an inner sidewall of said second knuckle, and leading a FPC (Flexible Printed Circuitry) into said second hinge aperture, and a projecting part being formed at one end of said second knuckle to be rotatably inserted into an inner periphery of said first hinge aperture, wherein said first housing comprises first knuckles at both ends defining a first hinge aperture that is directed to the direction of said second hinge aperture for connection to the second knuckle, and a first slot extending from a bottom of one of the first knuckles toward a front surface of the first housing, and wherein, said projecting part and a FPC passage route of the second hinge aperture, have a second slot serving as a passageway for a FPC's connection part, said second slot allowing said FPC's connection part that is wider than the diameter of said second hinge aperture to pass there through, and wherein said second knuckle has a subsidiary guide slot on the opposite parts of said projecting part and the FPC passage route of the second hinge aperture, serving as a guideway for said FPC's connection part and preventing said FPC's connection part from being damaged during passing said second hinge aperture.

2. The folder type mobile communication terminal as set forth in claim 1, wherein the depth of insertion of the projecting part formed at one end of said second knuckle into said first hinge aperture is so sized that said first and second housings are assembled with ease and do not break off during openings and closings thereof.

* * * * *